(12) United States Patent
Gordon

(10) Patent No.: US 7,184,669 B2
(45) Date of Patent: *Feb. 27, 2007

(54) OPTICAL TRANSCEIVER SYSTEMS AND METHODS

(75) Inventor: Gary B. Gordon, Saratoga, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 687 days.

This patent is subject to a terminal disclaimer.

(21) Appl. No.: 10/133,826

(22) Filed: Apr. 26, 2002

(65) Prior Publication Data

US 2004/0213516 A1    Oct. 28, 2004

(51) Int. Cl.
*H04B 10/00* (2006.01)

(52) U.S. Cl. .................... 398/138; 398/58; 398/60; 398/66; 398/67; 398/68; 398/70; 398/71; 398/72; 398/73; 398/79; 398/82; 398/83; 398/88; 398/135; 398/139; 398/182; 398/202; 385/24; 385/31; 385/38; 385/32; 385/48

(58) Field of Classification Search ............ 385/48, 385/31, 126, 89, 49, 38, 32, 24; 257/461; 398/60, 58, 66, 67, 68, 70, 71, 72, 73, 79, 398/82, 83, 88, 135, 138, 139, 182, 202
See application file for complete search history.

(56) References Cited

U.S. PATENT DOCUMENTS

| | | | |
|---|---|---|---|
| 4,173,390 A | | 11/1979 | Kach |
| 4,549,782 A | * | 10/1985 | Miller ........................ 385/48 |
| 5,105,293 A | | 4/1992 | Bortolini |
| 5,122,893 A | | 6/1992 | Tolbert |
| 5,369,719 A | * | 11/1994 | Mishima et al. ............... 385/48 |
| 5,499,309 A | * | 3/1996 | Kozuka et al. ................ 385/38 |
| 5,734,765 A | * | 3/1998 | Artjushenko et al. ......... 385/31 |
| 5,854,865 A | * | 12/1998 | Goldberg ...................... 385/31 |
| 5,963,349 A | | 10/1999 | Norte |
| 6,081,638 A | * | 6/2000 | Zhou ............................ 385/31 |
| 6,188,495 B1 | * | 2/2001 | Inoue et al. .................. 398/139 |
| 6,521,968 B2 | * | 2/2003 | Kuhara et al. ............... 257/461 |
| 6,757,460 B2 | * | 6/2004 | Melchior et al. ............. 385/31 |
| 6,757,467 B1 | * | 6/2004 | Rogers ........................ 385/126 |
| 6,956,996 B2 | * | 10/2005 | Gordon et al. ................ 385/48 |

FOREIGN PATENT DOCUMENTS

EP    0323074    7/1989

(Continued)

OTHER PUBLICATIONS

Ripin D J et al: "High Efficiency Side-Coupling of Light Into Optical Fibres Using Imbedded V-Grooves" Electronics Letters, IEE Stevenage, GB, vol. 31 No. 25 Dec. 7, 1995 (Dec. 7, 1995), pp. 2204-2205.

*Primary Examiner*—Hanh Phan

(57) ABSTRACT

Optical systems are provided. A representative optical system includes an optical transceiver with an optical source and an optical receiver. The system also includes an optical waveguide. At least one of the optical source and the optical receiver is optically coupled to an intermediate portion of the optical waveguide. The optical source provides optical signals for propagation by the optical waveguide, and the optical receiver receives optical signals propagated by the optical waveguide. Methods, optical transceivers and other systems also are provided.

9 Claims, 4 Drawing Sheets

FOREIGN PATENT DOCUMENTS

| | | |
|---|---|---|
| EP | 1 008 876 A2 | 6/2000 |
| GB | 2 168 165 A | 6/1986 |
| GB | 2328818 | 3/1999 |
| WO | WO 90/02349 | 3/1990 |

* cited by examiner

OPTICAL TRANSCEIVER SYSTEMS AND METHODS

FIELD OF THE INVENTION

The present invention generally relates to communications systems and, more particularly, to systems and methods involving the use of optical transceivers.

DESCRIPTION OF THE RELATED ART

The desire for increasing data-handling capacity of communication systems has resulted in a trend toward using optical communication systems. Because of this, much effort has been devoted to producing optical analogues of electrical communication system components. By way of example, optical fiber is used as a transmission medium for propagating optical signals, whereas copper wire typically is used to propagate electrical signals.

Optical transceivers, i.e., components that are able to transmit and receive optical signals, also are known. Typically, prior art optical transceivers are end-coupled to optical fibers. That is, both the optical transmitter and the optical receiver of an optical transceiver are optically coupled to an end of an optical fiber. Although end-coupling typically can be performed efficiently with respect to an existing end of an optical fiber, optically coupling an optical transceiver to a location between the existing ends of an optical fiber is more problematic. In particular, to accomplish such coupling, the optical fiber typically is separated into two segments, each of which includes one of the previously existing ends and an end created during separation. An optical transceiver then is end-coupled to each of the optical fiber segments at the newly created end. As should be understood, this process can be time-consuming and results in disruption of signal propagation through the optical fiber until the optical transceivers are installed.

Based on the foregoing, it should be appreciated that there is a need of improved systems and methods that address these and/or other perceived shortcomings of the prior art.

SUMMARY OF THE INVENTION

Systems and methods of the present invention involve the use of optical transceivers, at least portions of which optically couple to intermediate portions of optical fibers. In particular, either or both of the optical source and optical receiver of an optical transceiver in accordance with the invention can optically couple to an intermediate portion of an optical fiber.

An optical system in accordance with the invention includes an optical transceiver with an optical source and an optical receiver. The system also includes an optical fiber. At least one of the optical source and the optical receiver is optically coupled to an intermediate portion of the optical fiber. The optical source provides optical signals for propagation by the optical fiber, and the optical receiver receives optical signals propagated by the optical fiber.

An optical transceiver in accordance with the invention includes a housing that incorporates a base and sidewalls extending upwardly from the base. One of the sidewalls defines an aperture that is sized and shaped for receiving an end and an intermediate portion of an optical fiber. An optical source is arranged within the housing so that the optical source is offset with respect to the propagation axis of the optical fiber. The optical source receives control signals and provides optical signals for propagation by the optical fiber in response to the control signals. An optical receiver also is arranged within the housing and is offset with respect to the propagation axis of the optical fiber. The optical receiver receives optical signals propagated by the optical fiber.

A method in accordance with the invention for communicating optical signals includes: providing an optical fiber having first and second ends, and an intermediate portion defined between the first and second ends; providing an optical receiver; providing an optical source; and optically coupling at least one of the optical receiver and the optical source to the intermediate portion of the optical fiber without segmenting the intermediate portion of the optical fiber.

Clearly, embodiments of the invention may exhibit features and/or advantages in addition to, or in lieu of, those mentioned above. Additionally, other systems, methods, features and/or advantages of the present invention will be or may become apparent to one with skill in the art upon examination of the following drawings and detailed description. It is intended that all such additional systems and/or methods be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
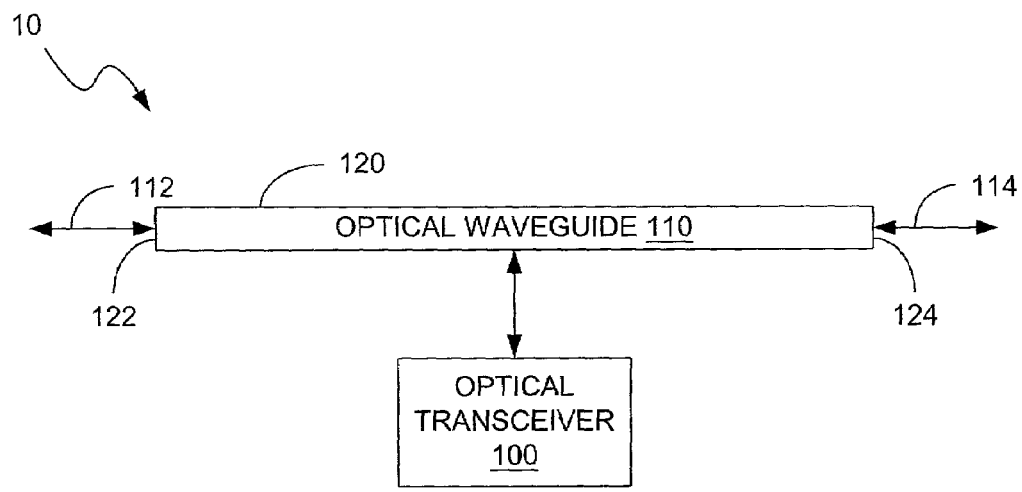
FIG. 1 is a schematic diagram of an embodiment of an optical system in accordance with the present invention.

Referring now to the drawings, FIG. 1 is a schematic diagram depicting an embodiment of an optical system 10 in accordance with the present invention. As shown in FIG. 1, optical system 10 includes an optical transceiver 100 and an optical waveguide 110. Optical waveguide 110 propagates optical signals, which are represented by the bidirectional arrows 112 and 114.

Optical transceiver 100 is optically coupled to optical fiber 110. More specifically, at least a portion of the optical transceiver is optically coupled to an intermediate portion 120 of the optical waveguide, i.e., that portion defined between the first and second ends 122, 124 of the waveguide. Thus, at least a portion of the optical transceiver is not end-coupled to the optical waveguide. Note, various types of optical waveguides, such as optical fibers, buried waveguides and planar waveguides can be used. In the exemplary embodiments that follow, optical fibers will be used as the optical waveguides. There is no intention, however, to limit the invention to this particular type of waveguide.

Figure 2:
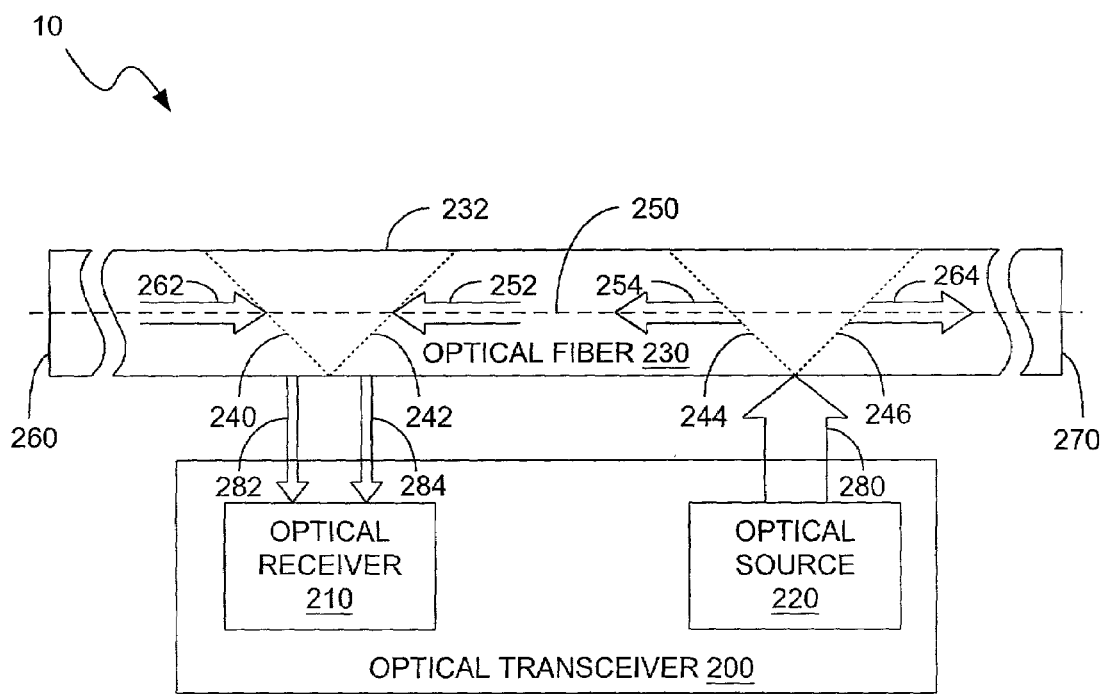
FIG. 2 is a schematic diagram of another embodiment of an optical system in accordance with the present invention.

Another embodiment of an optical system 10 in accordance with the present invention is depicted schematically in FIG. 2. As shown in FIG. 2, optical system 10 includes an optical transceiver 200 that incorporates an optical receiver 210 and an optical source 220. Optical system 10 also includes an optical fiber 230 that is optically coupled to the optical transceiver 200. In particular, optical receiver 210 and optical source 220 are optically coupled to an intermediate portion 232 of the optical fiber. Optical fiber 230 includes reflective surfaces 240, 242, 244 and 246 that are inclined with respect to a propagation axis 250 of the fiber. These reflective surfaces optically couple the optical transceiver and the optical fiber. Note, in FIG. 2, several optical signals are depicted. In particular, arrows 252 and 254 represent optical signals propagating through the optical fiber toward a first end 260 of the fiber, and arrows 262 and 264 represent optical signals propagating toward a second end 270 of the fiber. The reflective surfaces 240 and 242 reflect optical signals 262 and 252, respectively, toward the optical receiver. The reflective surfaces 244 and 246 receive optical signals 280 from the optical source, and divide and reflect the optical signal 280 to produce optical signals 264 and 254.

Note, arrows 282 and 284, which represent the optical signals propagated from the optical fiber to the optical receiver, are smaller than the arrows representing optical signals 262 and 252. This is because only a portion of an optical signal propagating through optical fiber 230 typically is reflected by a reflective surface (240, 242) and directed to the optical receiver. Likewise, arrows 254 and 264 are smaller than the arrow representing optical signal 280, which is provided by the optical source. This is because the optical signal 280 is divided to form the optical signals 254 and 264.

Note, reflective surfaces 244 and 246 and optical source 220 can be arranged in various configurations to establish how much of the optical signal 280 is to be reflected by each of the reflective surfaces and, thus, the relative intensity of optical signals 254 and 264. Also note that, in some embodiments, a reflective surface can reflect all of the optical signals that are incident thereupon. In such an embodiment, the optical signals do not propagate through the reflective surface for continued propagation along the optical fiber.

Figure 3:
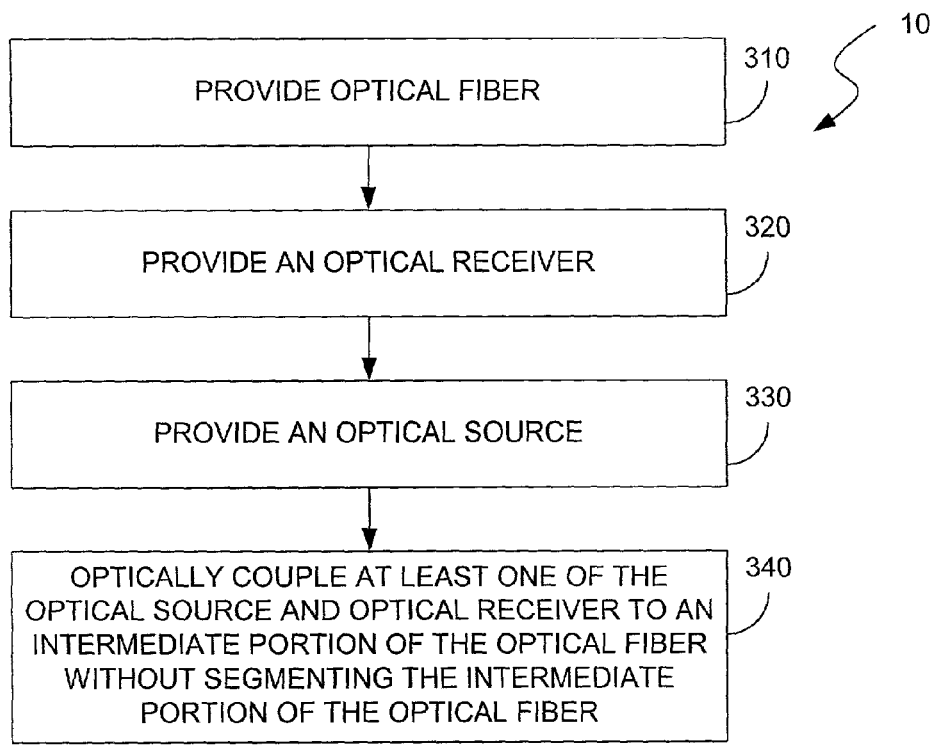
FIG. 3 is flowchart depicting functionality of the embodiment of FIG. 2.

Referring now to the flowchart of FIG. 3, functionality of the embodiment of the optical system 10 of FIG. 2 will be described. As shown in FIG. 3, the functionality (or method) may be construed as beginning at block 310, where an optical fiber is provided. In blocks 320 and 330, an optical receiver and an optical source, respectively, are provided. Thereafter, as depicted in block 340, at least one of the optical receiver and optical source is optically coupled to an intermediate portion of the optical fiber without segmenting the optical fiber.

As described with respect to FIG. 2, reflective surfaces are used to couple optical transceivers in accordance with the invention to optical fibers. Different types and arrangements of reflective surfaces can be used. For instance, in some embodiments, a material exhibiting a different index of refraction than that of the optical fiber can be arranged in the fiber. For example, silver could be used. Such a material could form a layer that is inclined with respect to the propagation axis of the fiber to cause optical signals to reflect from the layer to a location offset with respect to the propagation axis. Note, the angle of inclination formed between the propagation axis of the fiber and a reflective surface is selected to ensure that an optical signal is directed either from the optical fiber and to the optical transceiver or vice versa.

In some embodiments, the layer can function as a unidirectional reflector (one-way mirror) that reflects optical signals incident upon one side of the layer, while enabling optical signals to pass through the layer from the other side. A frequency-dependent grating also could be used. Such an embodiment would be capable of redirecting one or more selected frequencies of optical signals, while permitting optical signals of other frequencies to pass without being redirected.

In order to form a reflective surface, an optical fiber can be divided into segments, such as by cutting the fiber to form ends that are inclined with respect to the propagation axis of the fiber. One or more of the ends then can be used to form reflective surfaces. For example, an end can be coated and/or surrounded by a material exhibiting a different index of refraction than the optical fiber so that optical signals reflect from the end. As another example, a component, such as a diffractive grating, can be attached to an end. The ends then could be optically re-coupled to provide a reflective surface located at an intermediate portion of the fiber.

In order for an optical signal that has been reflected by a reflective surface to propagate to an optical transceiver, the optical signal typically propagates through the side of the optical fiber. Since an optical fiber typically uses a cladding formed about the core of the fiber to maintain propagation of the optical signals along the fiber, the optical fiber used typically exhibits a discontinuity in the cladding. By way of example, an optical fiber with a continuous cladding may be modified, such as by chemically treating the fiber to remove a portion of the cladding or by mechanically removing (nipping away) a portion of the cladding, so that a discontinuity is formed. Optical signals then can be directed from the optical fiber at the location of the discontinuity.

Figure 4:
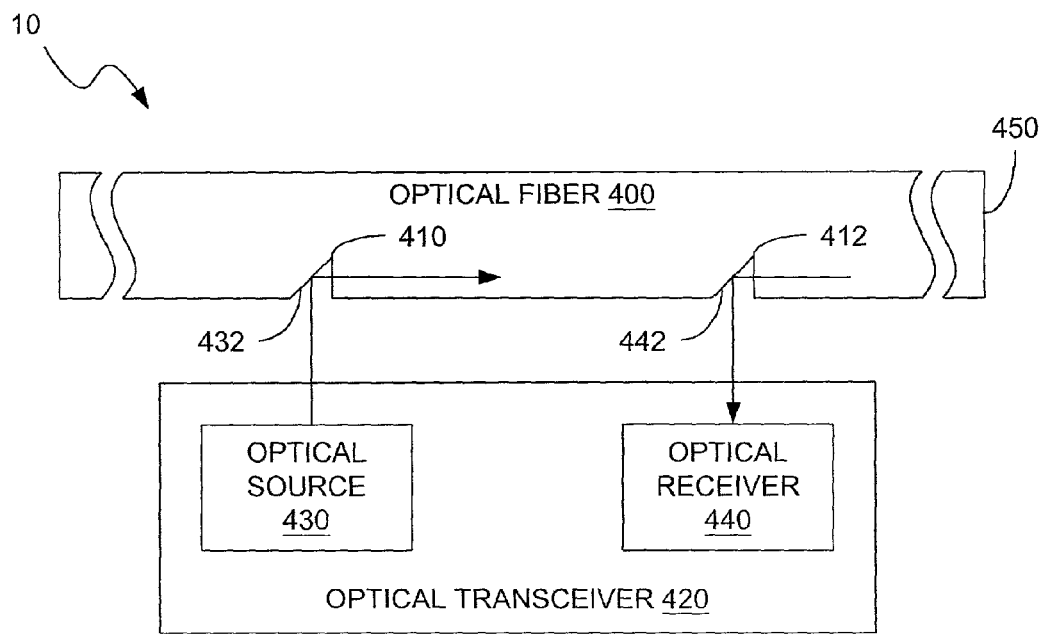
FIG. 4 is a schematic diagram of another embodiment of an optical system in accordance with the present invention.

As shown in FIG. 4, shaped notches called "facets" can form discontinuities in the cladding of an optical fiber as well as reflective surfaces for directing optical signals. More specifically, optical fiber 400 of FIG. 4 includes facets 410 and 412. Optical transceiver 420 is optically coupled to the fiber via the facets. In particular, optical source 430 is optically coupled to the fiber via facet 410, which includes a reflective surface 432. Similarly, optical receiver 440 is optically coupled to the optical fiber via facet 412, which includes a reflective surface 442. As mentioned before with respect to forming a discontinuity in the cladding of an optical fiber, the facets can be chemically and/or mechanically formed, for example.

Note that in the embodiment of FIG. 4, optical system 10 directs optical signals toward and receives optical signals from only one end, i.e., end 450, of the optical fiber. Another embodiment that directs optical signals toward and receives optical signals from only one end of an optical fiber is depicted in FIG. 5.

Figure 5:
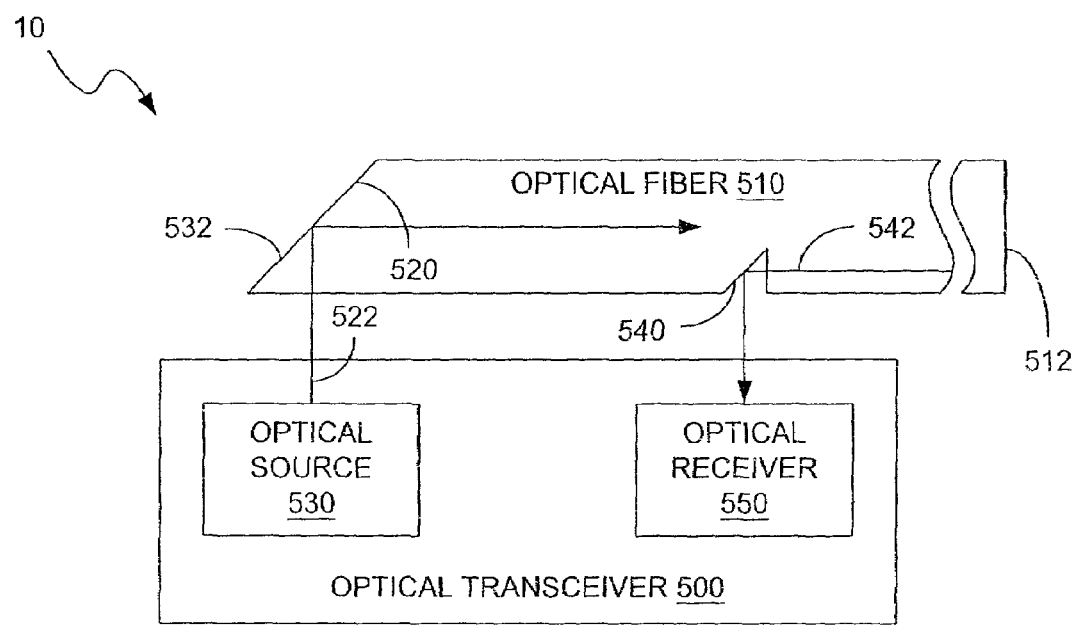
FIG. 5 is a schematic diagram of another embodiment of an optical system in accordance with the present invention.

In FIG. 5, optical system 10 includes an optical transceiver 500 that is optically coupled to an optical fiber 510. Optical transceiver 500 directs optical signals toward and receives optical signals directed from a first end 512 of the optical fiber. In particular, a first reflective surface 520 of the optical fiber receives optical signal 522 from optical source 530, and directs the optical signal 522 toward the first end of the fiber. Additionally, a reflective surface 540 receives optical signal 542 propagating from the first end 512, and directs this optical signal to optical receiver 550.

Note, the first reflective surface 520 is formed by an inclined end surface 532 of the optical fiber. Inclined end surface 532 can be formed by cleaving the optical fiber.

Figure 7:
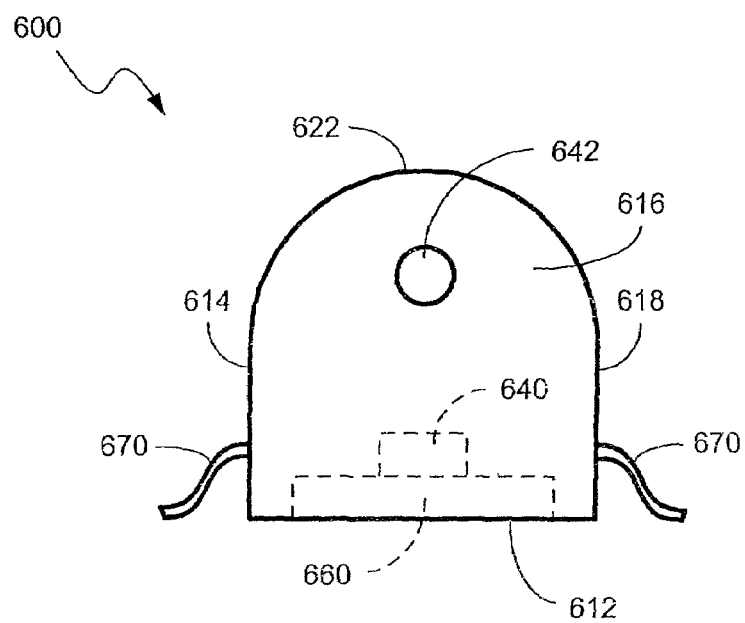
FIG. 7 is a side elevational view of the optical transceiver of FIG. 6.
Figure 6:
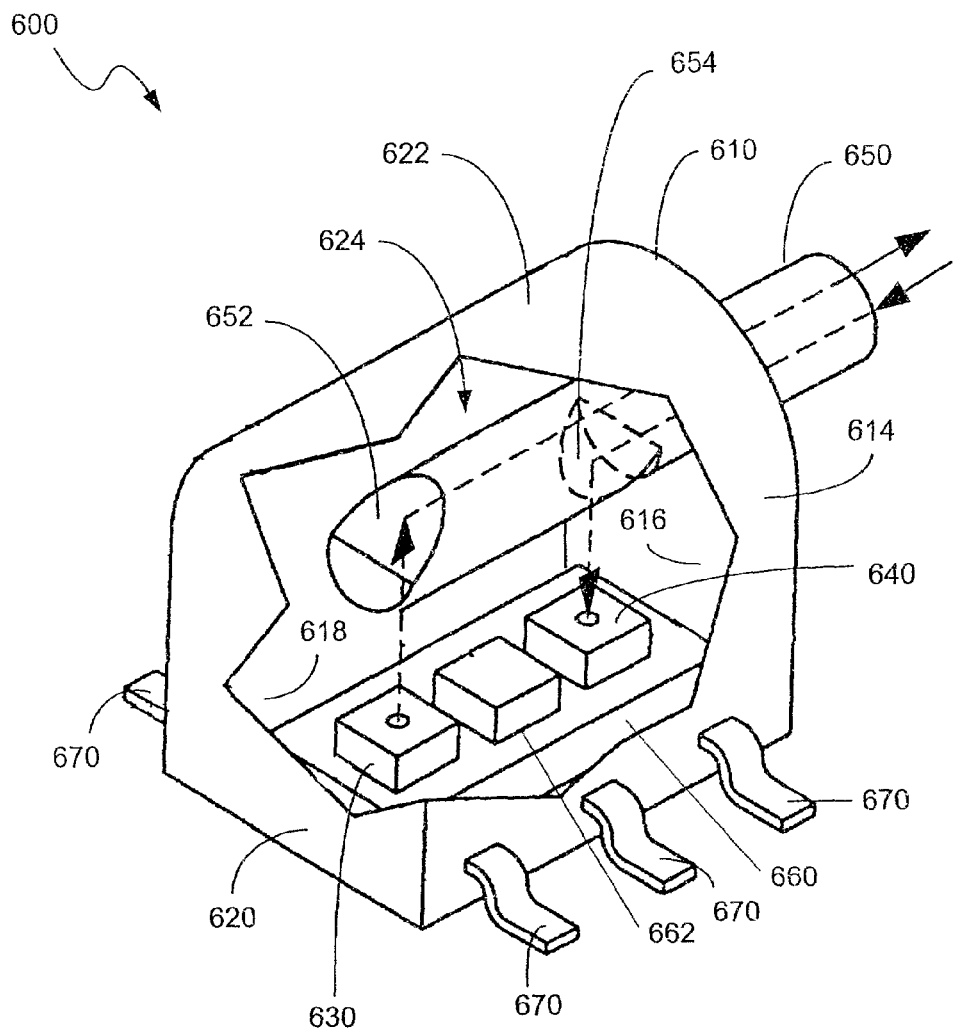
FIG. 6 is a partially cut-away, perspective view of an embodiment of an optical transceiver in accordance with the present invention.

Reference will now be made to FIGS. 6 and 7, which depict an embodiment of an optical transceiver in accordance with the invention. As shown in FIG. 6, which is a partially cut-away, perspective view, optical transceiver 600 includes a housing 610. Housing 610 incorporates a base 612 and sidewalls 614–620 extending upwardly from the base. Sidewalls 614 and 618 merge to form a curved upper surface 622 of the housing. Housing 610 also defines an interior 624 within which an optical source 630 and an optical receiver 640 are arranged.

As shown in FIG. 7, sidewall 616 defines an aperture 642 that is sized and shaped for receiving an end and an intermediate portion of an optical fiber. In this regard, an optical fiber 650 is depicted in FIG. 6 as being inserted within the aperture. Insertion of the fiber within the aperture positions the fiber so that the propagation axis of the fiber is offset with respect to the optical source and optical receiver. The sidewall 616 supports the optical fiber in this position.

Optical fiber 650 includes reflective surfaces 652 and 654. Reflective surface 652 is aligned with optical source 630 and optically couples the optical source to the fiber. Likewise, reflective surface 654, which is formed by a facet, is aligned with optical receiver 640 and optically couples the optical receiver to the fiber.

Optical source 630 and optical receiver 640 are supported by a substrate 660 that also is used to support control circuitry 662. The control circuitry receives electrical signals via one or more pins 670. In response to the electrical signals, the control circuitry provides a control input to the optical source so that the optical source can generate optical signals for propagation to optical fiber 650. The control circuitry also can control the flow of data from the optical transceiver. In this respect, the optical receiver receives optical signals and converts the optical signals into electrical signals. The electrical signals then are provided to the pins in response to control signals from the control circuitry. In some embodiments, an analog-to-digital converter can be included for converting the analog electrical signals to digital signals.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to illustrate the principles of the invention and its practical application to thereby enable one of ordinary skill in the art to utilize the invention in various embodiments and with various modifications as are suited to the particular use contemplated.

By way of example, frequency diversity between the optical signals detectable by an optical receiver and the optical signals provided by a corresponding optical source can be used to limit crosstalk. In particular, an optical receiver may only be able to detect one or more frequencies of optical signals, and the optical source may be incapable of emitting optical signals of the detectable frequencies. In other embodiments, differential detection of optical signals can be used. In particular, one or more optical receivers can be used to differentially detect multiple optical signals, each of which exhibits a different frequency. In such an embodiment, multiple optical sources could be provided by the optical transceiver so that the transceiver is capable of emitting optical signals at each of the multiple frequencies.

All such modifications and variations are within the scope of the invention as determined by the appended claims when interpreted in accordance with the breadth to which they are fairly and legally entitled.

The invention claimed is:

1. An optical transceiver for use with an optical fiber, the optical fiber having a first end and a second end, a propagation axis extending between the first end and the second end, and an intermediate portion defined between the first and the second end, said optical transceiver comprising:
   a housing having a base and sidewalls extending upwardly from said base, a first of said sidewalls defining an aperture, said aperture being sized and shaped for receiving the first end and at least a portion of the intermediate portion of the optical fiber;
   an optical source arranged within said housing such that said optical source is offset with respect to the propagation axis of the optical fiber, said optical source being optically coupled to the optical fiber at the first end; and
   an optical receiver arranged within said housing such that said optical receiver is offset with respect to the propagation axis of the optical fiber, said optical receiver being optically coupled to the optical fiber at the intermediate portion of the optical fiber.

2. The optical transceiver of claim 1, wherein the optical source is optically coupled to the optical fiber using a first reflective surface of the first end.

3. The optical transceiver of claim 2, wherein the optical receiver is optically coupled to the optical fiber using a facet located at the intermediate portion of the optical fiber.

4. A method for optical communications, the method comprising:
   providing an optical fiber;
   cutting the optical fiber into two segments at an intermediate portion of the optical fiber, whereby an end of a first segment is inclined with respect to a propagation axis of the first segment and an end of a second segment is inclined with respect to a propagation axis of the second segment;
   coating the end of the first segment with a reflective coating; and
   optically coupling the end of the first segment to the end of the second segment to form a reflective surface at the intermediate portion of the optical fiber.

5. The method of claim 4, further comprising:
   providing an optical transceiver;
   coupling the optical transceiver to a side of the optical fiber at the intermediate portion of the optical fiber;
   transmitting a first optical signal from the optical transceiver into the side of the optical fiber; and
   using the reflective surface to direct the first optical signal along a propagation axis of the optical fiber.

6. The method of claim 5, further comprising:
   using the reflective surface to direct a second optical signal traveling along the propagation axis of the optical fiber out of the side of the optical fiber and into the optical transceiver.

7. The method of claim 4, further comprising:
   providing an optical transceiver;
   providing a facet between the intermediate portion of the optical fiber and an end of the optical fiber;
   optically coupling the optical transceiver to a side of the fiber, the optical coupling operable to direct a first optical signal from the optical transceiver towards the facet; and using the facet to direct the first optical signal along a propagation axis of the optical fiber.

8. The method of claim 7, further comprising:
using the facet to direct a second optical signal traveling along the propagation axis of the optical fiber out of the side of the optical fiber and into the optical transceiver.

9. An optical fiber comprising:
a first end;
a second end formed of an inclined reflecting surface operable to direct light towards the first end of the fiber, the light being received through a side of the optical fiber at the second end; and
a facet located at an intermediate portion of the optical fiber, the facet operable to receive light propagating from the first end towards the second end, and direct the received light out of a side of the fiber at the intermediate portion of the optical fiber.

* * * * *